United States Patent [19]

Velazquez

[11] 3,984,909

[45] Oct. 12, 1976

[54] VALVE STEM SEAL CHANGING TOOL

[76] Inventor: Salvador Velazquez, 5051 N. Kenmore, Apt. 205, Chicago, Ill. 60640

[22] Filed: May 6, 1975

[21] Appl. No.: 574,921

[52] U.S. Cl. .............................................. 29/217

[51] Int. Cl.² .................................... B23P 19/04

[58] Field of Search ............. 29/217, 219, 215, 220; 81/3 R

[56] References Cited

UNITED STATES PATENTS

| | | | |
|---|---|---|---|
| 2,173,398 | 9/1939 | Michner et al. | 29/220 |
| 3,259,967 | 7/1966 | Marsicano | 81/3 R |
| 3,286,330 | 11/1966 | Peters | 29/219 |
| 3,406,412 | 10/1968 | Kottas | 81/3 R |

FOREIGN PATENTS OR APPLICATIONS

| | | | |
|---|---|---|---|
| 1,029,257 | 3/1953 | France | 29/215 |
| 1,060,895 | 11/1952 | France | 29/217 |

*Primary Examiner*—James L. Jones, Jr.
*Attorney, Agent, or Firm*—Clarence A. O'Brien; Harvey B. Jacobson

[57] ABSTRACT

An elongated cylindrical support member is provided and includes structure at its opposite ends for removable support of the support member from exhaust manifold mounting studs or bolts of the head of a reciprocating piston overhead valve combustion engine with the support member extending longitudinally of one side of the head. An elongated support arm has one end thereof mounted on the elongated support member for guided movement therealong and swinging movement of the support arm about the support member, the support arm being disposed at generally right angles to the support member. The other end of the support arm includes structure for releasable anchoring relative to the side of the associated cylinder head remote from the elongated support member with the support arm extending across the head and an intermediate portion of the support arm includes a window formed therethrough. The arm is slidable longitudinally of the elongated support member for registry of the window with a valve assembly of the head and a thrust member is supported from the support arm for guided movement along a path extending through the window formed in the support arm whereby the thrust member may engage a valve spring retainer and/or the adjacent end of the associated valve spring projecting through the opening in order to compress the valve spring while the associated valve is held in the closed position, thereby swinging the valve spring retainer keepers for removal and allowing disassembly of the valve spring and keeper from the corresponding valve preparatory to subsequent replacement of the valve stem seal.

8 Claims, 6 Drawing Figures

VALVE STEM SEAL CHANGING TOOL

BACKGROUND OF THE INVENTION

For various reasons it becomes advisable to replace the valve stem seals provided on some overhead valve internal combustion engines of the type presently utilized to power motor vehicles. The valves of an overhead valve combustion engine are usually readily accessible, insofar as the ends thereof remote from the valve heads are concerned, by the removal of one or more valve covers provided for the purpose of enclosing those portions of the valves disposed exteriorly of the cylinder head casting. After the valve covers have been removed the valve retainers and keepers therefor may be displaced relative to the valve stems in order to release the keepers for removal of the valve spring retainers and valve springs, after which removal the valve stem seals are exposed.

While various structures have been heretofore provided for displacing the valve spring retainers and valve springs sufficiently to remove the valve spring retainer keepers once a cylinder head has been removed from its associated cylinder block, removal of a cylinder head from an overhead valve combustion engine merely in order to allow replacement of the valve stem seals constitutes an excessive amount of labor in order to accomplish a reasonably simple replacement task.

Various forms of tools previously designed for use in compressing valve springs after the associated cylinder head has been removed from its companion cylinder block are disclosed in U.S. Pat. Nos. 1,621,237, 1,849,538, 1,858,372, 2,524,949, 2,566,460, 2,865,049 and 3,286,330.

SUMMARY OF THE INVENTION

The tool of the instant invention is constructed in a manner whereby the valve spring retainers and associated valve springs of overhead valve internal combustion engines may be sufficiently displaced relative to the valves in order to allow disassembly of the keepers and valve springs in order to expose the valve stem seals to be replaced without removal of the cylinder head from its associated cylinder block. In this manner, valve stem seals on an overhead valve combustion engine may be replaced in considerably less time than that which is normally associated with valve stem seal replacement operations involving removal of the associated cylinder head.

The main object of this invention is to provide a tool operative to sufficiently displace the valve spring retainers and valve springs of an overhead valve combustion engine in a manner not requiring removal of the cylinder head of the engine from the cylinder block.

Another object of this invention is to provide a valve spring compressing tool which may be utilized on various types of overhead valve combustion engines.

Still another object of this invention is to provide a tool in accordance with the preceding objects together with a companion tool for insertion through the spark plug bores of the associated cylinder head and engagement with the head portions of the valves of the engine in order to maintain the valves in fully seated positions and to prevent axial displacement of the stem portions of the valves from the valve guides.

A final object of this invention to be specifically enumerated herein is to provide a tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

DETAILED DESCRIPTION OF THE INVENTION

Figure 1:
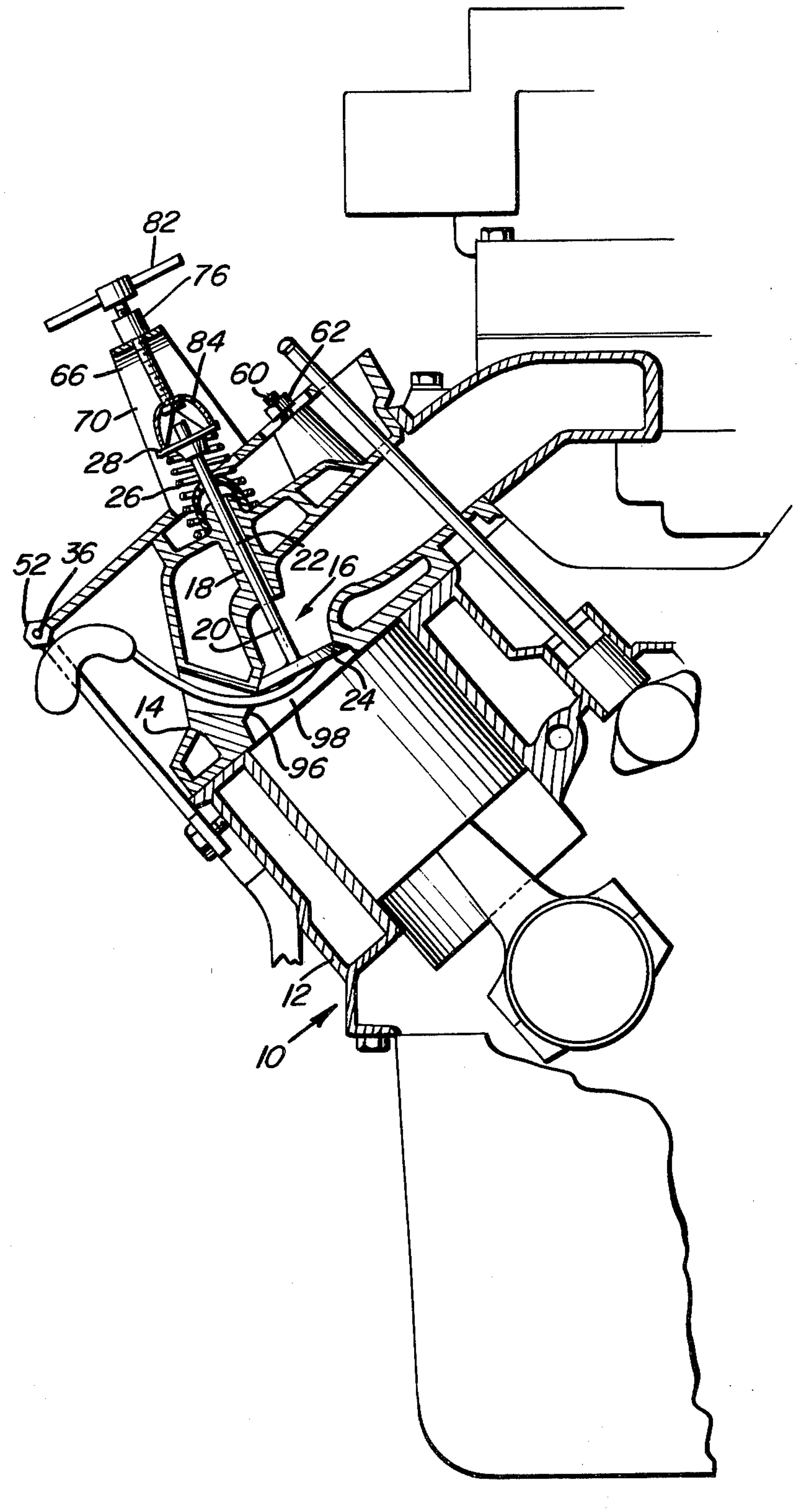
FIG. 1 is a transverse vertical sectional view of the tool of the instant invention in operative association with one of the overhead valves of an internal combustion engine.

Referring now more specifically to the drawings, the numeral 10 generally designates a conventional form of internal combustion engine including a cylinder block 12 having at least one cylinder head 14 removably supported therefrom. The cylinder head 14 includes a plurality of overhead valve assemblies referred to by the reference numeral 16 and each valve assembly 16 includes a cylinder head supported valve guide 18, a poppet valve 20 including a stem 22 and a head 24, a valve spring 26, a valve spring retainer 28, a pair of valve spring retainer keepers 30 and a cup-shaped valve stem seal 32.

Figure 2:
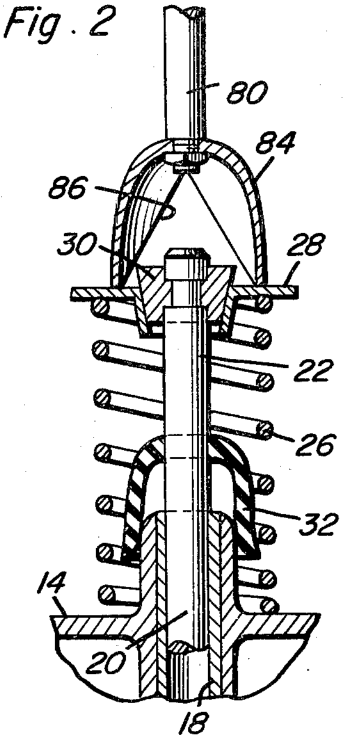
FIG. 2 is an enlarged fragmentary vertical sectional view taken substantially upon a plane passing through the center of the poppet valve assembly illustrated in FIG. 1.
Figure 3:
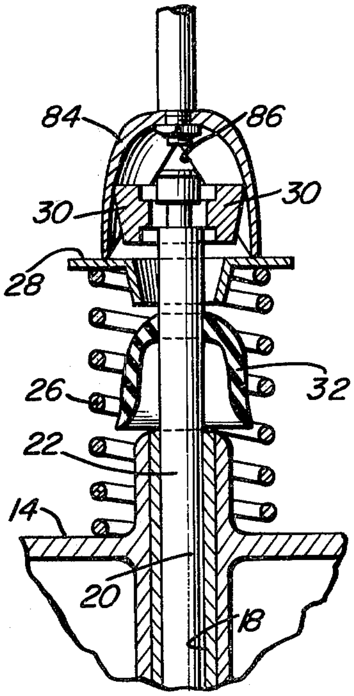
FIG. 3 is a fragmentary sectional view similar to FIG. 2 but illustrating the manner in which the abutment portion of the tool is operative to displace the valve keeper and adjacent valve spring end sufficiently to allow removal of the valve spring retainer keepers.

It is often desirable to replace the seals 32. However, in order to replace the seals 32 it has in the past been necessary to remove the cylinder head 14 and to thereafter place the cylinder head 14 within the jig including means whereby the valve 20 may be held in closed position and the valve spring keeper 28 and adjacent end portion of the spring 26 may be displaced toward the head 24 of the valve 20. By displacement of the valve spring keeper 28 from the position thereof illustrated in FIG. 2 to the position thereof illustrated in FIG. 3, the valve spring retainer keepers 30 are exposed and may be readily removed. Thereafter, the valve spring retainer 28 may be allowed to expand until it reaches its static condition and the valve spring 26 and retainer 28 may be thereafter removed in order that the valve stem seal 32 to be replaced may be readily slipped off the end of the valve stem 22 remote from the head 24 and a new valve stem seal may be placed on the valve stem 22.

Figure 4:
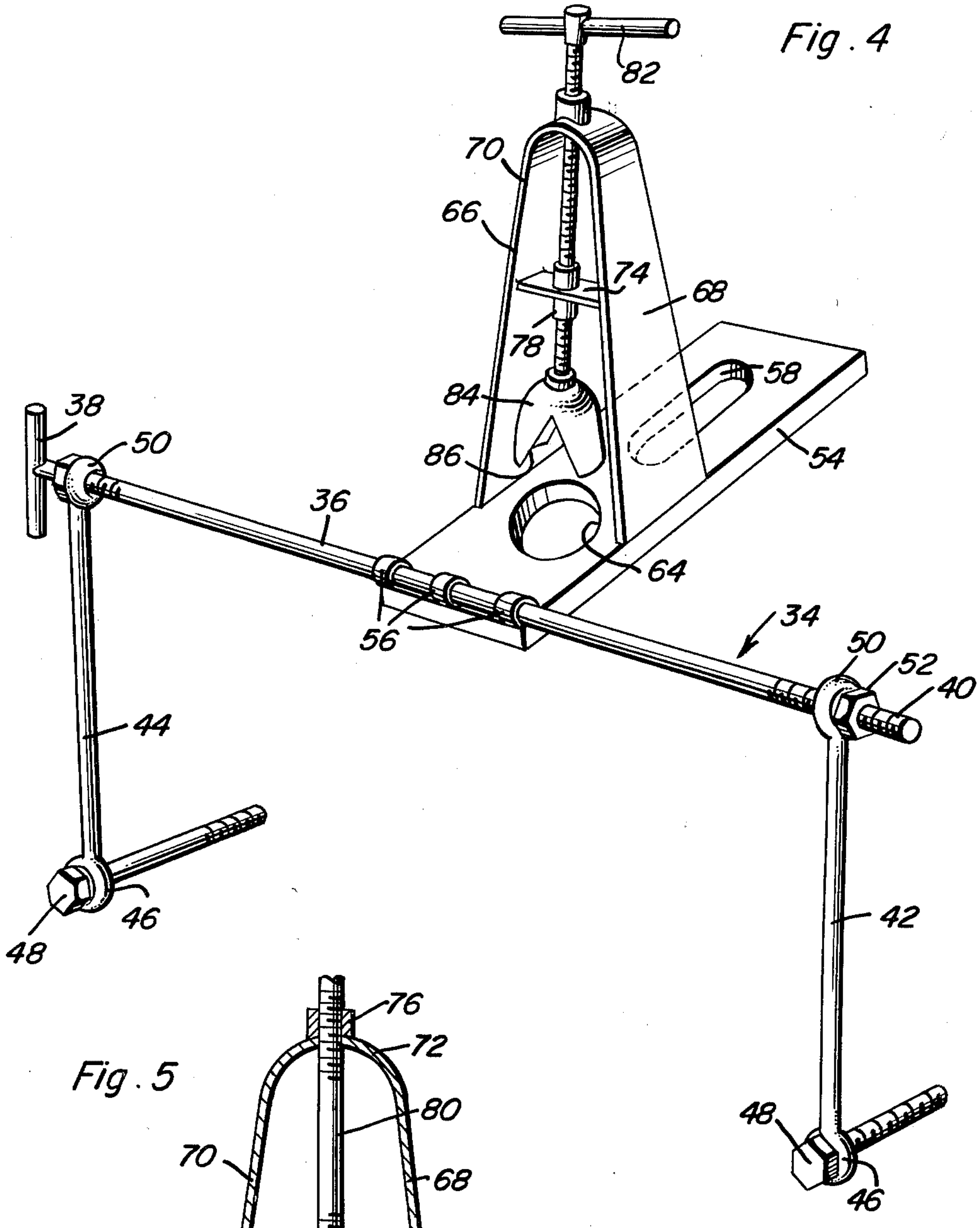
FIG. 4 is a perspective view of the tool of the instant invention on somewhat of an enlarged scale.
Figure 5:
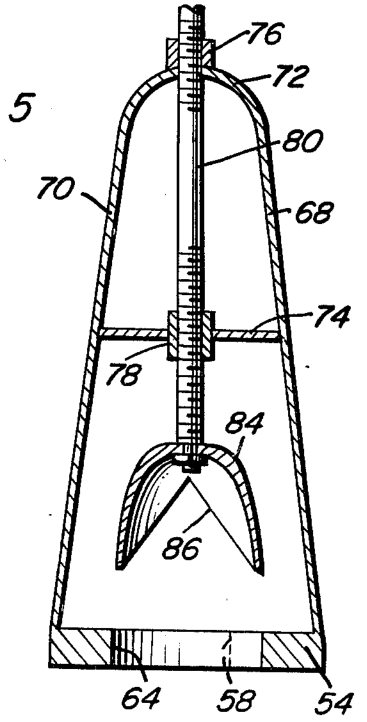
FIG. 5 is a fragmentary vertical sectional view illustrating the manner in which the threaded screw member portion of the instant invention is threadedly supported for advancement toward and away from a window formed through the slidable and pivotable support arm portion of the invention.

The valve stem seal changing tool of the instant invention is referred to in general by the reference numeral 34 and includes an elongated cylindrical support rod 36 having a handle 38 at one end and externally threaded as at 40 on its other end. In addition, a pair of upright supports 42 and 44 are provided and include integral lower eye portions 46 by which the lower ends of the supports may be anchored in a stationary manner relative to the engine 10 through the utilization of exhaust manifold mounting bolts 48. The upper ends of the supports 42 and 44 include additional aligned eye portions 50 through which the opposite end portions of the support member extend and a threaded nut 52 is threaded on the externally threaded end 40 of the support member 36, see FIG. 4.

From FIG. 1 of the drawings it may therefore be seen that the support member 36 is supported from the engine 10 in position with the support member 36 extending along one side of the cylinder head 14.

The tool 34 additionally includes a panel-like support arm 54 including spaced axially aligned sleeves 56 on one end through which the cylindrical support member 36 is slidably and rotatably received. Thus, the support arm 54 may be swung about the support member 36 and slid longitudinally therealong.

The end of the support arm 54 remote from the aligned sleeves 56 includes a longitudinally extending slot 58 through which a rocker arm mounting stud 60 of the cylinder head 14 may be secured by means of a suitable threaded fastener 62. In addition, the support arm 54 further includes a window or opening 64 formed therethrough intermediate the slot or opening 58 and the sleeves 56. The opening 64 may be registered with one of the valve springs 26 and the associated valve spring retainer 28 whereby the retainer 28 and the upper portion of the spring 26 may be received through the window or opening 64 when the support arm 54 is secured in the position thereof illustrated in FIG. 1 of the drawings by means of the fasteners 62 after having been properly aligned with a selected valve.

The support arm 54 includes an inverted U-shaped support 66 comprising a pair of upwardly convergent legs 68 and 70 secured at their lower ends to opposite side portions of the support arm 54 and joined at their upper ends by means of an integral curved bight portion 72. In addition, a transverse brace 74 is secured between the mid-portions of the legs 68 and 70 and the bight portion 72 and brace 74 have aligned internally threaded sleeves 76 and 78 supported therefrom through which a threaded screw shaft 80 is threadedly engaged. The upper end of the screw shaft 80 includes a handle 82 and the lower end of the screw shaft 80 has a downwardly opening cup-shaped abutment member 84 rotatably supported therefrom, the abutment member including diametrically opposite downwardly opening notches 86.

Figure 6:
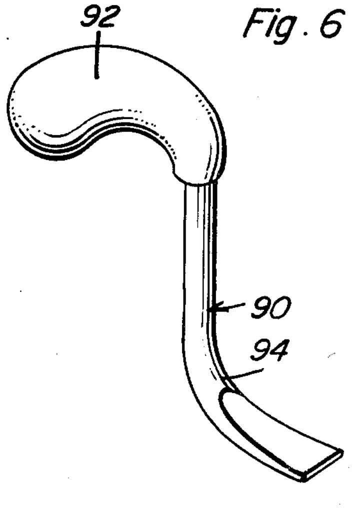
FIG. 6 is a perspective view of a companion hand tool to be utilized in the manner illustrated in FIG. 1 of the drawings in order to maintain the poppet valve with which the valve spring retainer displacement tool is operatively associated in a closed position.

After the tool 34 has been supported from the engine 10 by means of the supports 42 and fasteners 48 in the manner hereinabove set forth and the support arm 54 has been properly registered with a selected valve assembly 16 and swung downwardly to a position with the retainer 28 and the adjacent end of the associated spring of that valve assembly projecting through the window 64, the support arm 54 is secured in position by means of the fastener 62. Then, the curve hand tool referred to in general by the reference numeral 90 and best illustrated in FIG. 6 of the drawings is gripped by its handle 92 on one end thereof and has the opposite curved end 94 inserted through the spark plug bore 96 of the associated combustion chamber 98 of the engine 10 in order to engage the end of the tool 90 remote from the handle 92 with the undersurface of the head 24 of the valve 20 so as to maintain the valve 20 in seated position against axial displacement of its valve stem 22 from the associated valve guide 18. Thereafter, the screw shaft 80 is turned so as to advance the notched abutment member 84 into position in engagement with the valve spring retainer 28 in the manner illustrated in FIG. 2 of the drawings. Thereafter, further rotation of the screw member 80 will cause the abutment member 84 to downwardly displace the valve spring retainer 28 and the adjacent end of the valve spring 26 to the position thereof illustrated in FIG. 3 of the drawings whereupon the valve spring retainer keepers 30 may be readily disengaged from the upper end of the stem 22 of the valve 20 and extracted from within the abutment member 84 through the notches 86. Thereafter, the screw member 80 may be reversed in rotation in order to be displaced out of engagement with the retainer 28. At this time, the fastener 62 may be removed and the support arm 54 may be swung to an out-of-the-way position thereby fully exposing the retainer 28 and the valve spring 26 for removal. After the retainer 28 and valve spring 26 have been removed, the valve stem seal 32 may be readily upwardly displaced from the end of the stem 22 remote from the head 24 and replaced by a new seal. Of course, the spring 26 and the spring retainer 28 are thereafter repositioned and the tool 34 is again utilized to downwardly displace the retainer 28 and the adjacent end of the spring 26 to the position thereof illustrated in FIG. 3 of the drawings after which the retainer keepers 30 may be reinstalled and the screw shaft 80 may again be backed away from the head 14 until the keepers 30 are in their fully seated positions illustrated in FIG. 2. Thereafter, the tool 34 may be utilized in the same manner to accomplish replacement of the next valve stem to be replaced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an internal combination engine including an elongated overhead poppet valve equipped cylinder head and provided with laterally outwardly projecting exhaust manifold mounting means on one side of said engine, said head including a plurality of upwardly projecting poppet valves arranged in side-by-side relation along a generally straight path extending longitudinally of said head, a tool for enabling the valve spring retainer keepers, the spring retainers and the springs to be removed while the head remains mounted on the engine and to thereby enable the valve stem seals to be replaced, said tool including an elongated support member supported from said engine on said one side thereof from said mounting means and with said support member generally paralleling said path, an elongated arm having one end thereof mounted on said support member for guided shifting therealong and with said arm disposed at generally right angles to said support member and swingable relative thereto about an axis generally paralleling said support member into and out of position overlying at least portion of said valves and disposed transverse to said path, the other free end of said arm and said engine, adjacent the other side of said head, including coacting means for releasably retaining said free end against displacement thereof to swing said arm away from said valves, and selectively actuatable thrust developing means carried by said arm intermediate its opposite ends including a valve spring retainer abutment member shiftable, upon actuation of said thrust developing means, laterally of said arm in a path generally paralleling the plane in which said arm is swingable, said abutment member, upon movement toward a valve spring retainer with which the path of movement of said abutment relative to said arm is aligned, being engageable with said retainer for shifting the latter in a direction to compress the associated valve spring.

2. The combination of claim 1 wherein said support member comprises an elongated cylindrical rod, said one end of said arm including transverse sleeve means rotatably and slidably mounted on said rod.

3. The combination of claim 1 wherein said arm defines a window therethrough intermediate its opposite ends, said arm being slidable along said support member for selective registry of said window with the upper portions of said valves, said path of movement of said abutment member extending through said window.

4. The combination of claim 1 wherein said thrust developing means comprises means carried by said arm defining a threaded bore substantially intersecting with said path and disposed at generally right angles relative thereto, and a threaded screw member threaded through said nut, said abutment member being mounted on one end of said screw member for relative rotation about an axis generally coinciding with the center axis of said threaded bore.

5. The combination of claim 4 wherein said abutment member comprises a generally cup-shaped member opening outwardly of said one end of said screw member.

6. The combination of claim 1 including an elongated pry bar having a smoothly curved less than right angle bend formed therein adjacent one terminal end thereof and a handle on the other end, said one terminal and the smoothly curving bent portion of said rod being adapted to be inserted into the combustion chamber of an overhead valve combustion engine through the spark plug opening and be utilized to manually retain an associated poppet valve in the closed position.

7. The combination of claim 1 wherein said support member includes an elongated cylindrical rod and a pair of upstanding supports, the lower ends of said supports being secured to said engine by said mounting means, said rod extending between and interconnecting the upper ends of said supports.

8. The combination of claim 7, wherein the upper ends of said supports include aligned eye portions through which the opposite end of said rod are removably secured.

* * * * *